Oct. 29, 1974 E. T. RATLIFF ET AL Re. 28,220

REED SWITCH HAVING REED SURFACES BENEATH THE SEAL PLATED WITH A THIN SILVER LAYER

Original Filed Sept. 23. 1971

United States Patent Office

Re. 28,220
Reissued Oct. 29, 1974

28,220

REED SWITCH HAVING REED SURFACES BENEATH THE SEAL PLATED WITH A THIN SILVER LAYER

Earl Truman Ratliff, Pataskala, and Paul William Renaut, Columbus, Ohio, assignors to Bell Telephone Laboratories, Incorporated, Murray Hill and Berkeley Heights, N.J.

Original No. 3,689,722, dated Sept. 5, 1972, Ser. No. 182,957, Sept. 23, 1971. Application for reissue Sept. 24, 1973, Ser. No. 399,843

Int. Cl. C03c *27/04;* H01h *51/28*

U.S. Cl. 335—154 7 Claims

Matter enclosed in heavy brackets [ ] appears in the original patent but forms no part of this reissue specification; matter printed in italics indicates the additions made by reissue.

ABSTRACT OF THE DISCLOSURE

A sealed contact dry reed switch in which nickel-iron reed contacts are held in a glass envelope by seals and in which the surfaces of the reed contacts, including those portions under the seals, are covered with a thin layer of silver.

BACKGROUND OF THE INVENTION

1. Field of the Invention

This invention relates to dry reed contacts which are typically sealed in a glass envelope to form a miniature switch and pertains in particular to the composition of a layer of conducting material disposed on the surface of the reed contacts.

2. Description of the Prior Art

Miniature switches for controlling high frequency signals must exhibit low insertion loss when used in high frequency circuit applications. Where the switches comprise reed contacts encapsulated in a glass envelope, the seals between the reed contacts and the glass must be strong and reliable. Heretofore, low insertion loss has been achieved by plating the reed contacts with a noble metal such as gold-silver alloy such as disclosed in the article beginning at page 203, in Volume 48 of the Bell Laboratories Record. It has been difficult, however, to obtain suitable seal strengths.

Accordingly, one object of this invention is to achieve strong and reliable seals in reed switches adapted for high frequency use.

SUMMARY OF THE INVENTION

In a preferred embodiment of this invention, a pair of nickel-iron reed contacts disposed in overlapping relationship with each other inside a glass envelope are each held in place by a seal so as to form a miniature switch and the surfaces of each reed contact, including that portion beneath the seal, is covered with a thin layer of silver to improve the strength of the seal and to provide low insertion loss characteristics when the switch is used in a circuit carrying high frequency signals.

According to one feature of this invention, improved seal strength, as well as low insertion loss, is achieved by plating the reed contacts with a layer of silver having a thickness in the range of 60 to 175 microinches.

DETAILED DESCRIPTION

Figure 1:
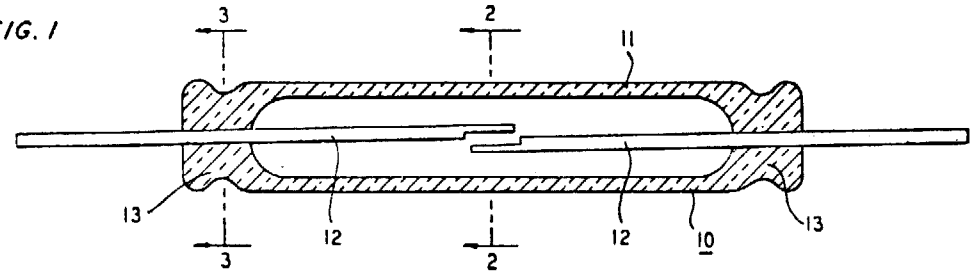
FIG. 1 is a side elevation view, taken in section, of a sealed contact dry reed switch made in accordance with this invention.

Referring to FIG. 1, a sealed contact dry reed switch 10 is disclosed which includes an encapsulating envelope 11 and a pair of overlapping reed contacts 12. The envelope 11 is typically made of glass, while the reed contacts 12 are made of a nickel-iron composition such as 52 alloy. Each reed contact 12 is firmly joined to the vessel 11 by a seal 13 which is formed by melting the material of the envelope 11 until it adheres to the surfaces of the reed contacts 12.

Figure 2:
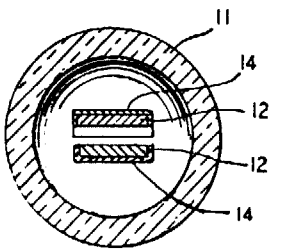
FIG. 2 is an end elevation, taken in section along the lines 2—2, of the sealed contact dry reed switch illustrated in FIG. 1.
Figure 3:
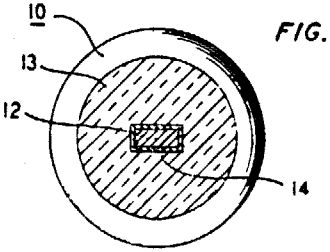
FIG. 3 is an end elevation, taken in section along the lines 3—3, of the sealed contact dry reed switch illustrated in FIG. 1.

As best understood from FIGS. 1 and 2, the entire surface of each reed contact 12 is covered by a silver layer 14. As shown in FIG. 3, each reed contact 12 is separated from its seal 13 by the silver layer 14.

As is well known, if the reed contacts 12 are coated by a silver layer 14, low insertion loss will be achieved when the reed switch 10 is used in a high frequency application, i.e., frequencies up to 100 megahertz. As can be seen from the following table, however, seal strengths drastically increase if the thickness of the silver layer 14 is limited to a range of 60 to 175 microinches. When deposition conditions can be regulated closely, better results will be obtained by limiting the silver layer 14 to a thickness in the range of 100 to 150 microinches. Best results, however, will be achieved by limiting the thickness to 120 microinches.

SEAL STRENGTH

| Silver Layer Thickness (Microinches) | Mean Tensile Strength (Pounds) |
|---|---|
| 0 | 12.0 |
| 60 | 13.5 |
| 118 | 15.0 |
| 175 | 13.5 |
| 233 | 12.0 |

While mating or contacting surfaces covered with silver can be used to make and break electrical circuits, other contact materials are preferable. Consequently, as shown in FIGS. 1 and 2, the overlapping portions of the reed contacts 12 are electrochemically stripped or otherwise treated until the silver layer 14 is removed. With the underlying nickel-iron alloy exposed, other contact materials such as a silver-gold alloy can be disposed thereon to serve as a contact surface.

In summary, a sealed contact dry reed switch has been disclosed which is suitable for use in high frequency circuit applications and which exhibits high seal strengths. While only a single embodiment has been disclosed, it is illustrative of the principles of this invention and others skilled in the art will readily conceive of others which will fall within the scope of the invention.

What is claimed is:

1. A switching device including a pair of elongated nickel-iron contacts disposed with their tips in over-lapping relationship and a glass envelope hermetically encapsulating the overlapping portions of said reed contacts and joined to each of said reed contacts by a glass-to-metal seal characterized in that the surface of each reed contact, including that portion located beneath a seal, is covered by a [thin] layer of silver [.] *having a thickness in the range of 60 to 175 microinches.*

[2. A switching device in accordance with claim 1 wherein the thickness of said layer of silver lies within the range of 60 to 175 microinches.]

3. A switching device in accordance with claim [2] *1* wherein a contacting portion located on one reed contact in registration with the corresponding contact portion on the other reed contact is devoid of a silver layer.

4. A switching device in accordance with claim 1 wherein the thickness of said layer of silver lies within the range of 100 to 150 microinches.

5. A switching device in accordance with claim 1 wherein the thickness of said layer of silver is 120 microinches.

*6. A reed switch comprising a pair of metallic reed contacts disposed with their tips in overlapping relationship and a glass envelope hermetically encapsulating the overlapping portions of the contacts and joined to each of the contacts by a glass-to-metal seal characterized in that the contact surface located beneath each seal is coated with a layer of silver between 60 and 175 microinches thick.*

*7. A reed switch in accordance with claim 6 wherein the layer of silver is between 100 and 150 microinches thick.*

*8. A reed switch in accordance with claim 6 wherein the layer of silver is 120 microinches thick.*

References Cited

The following references, cited by the Examiner, are of record in the patented file of this patent or the original patent.

UNITED STATES PATENTS

| | | | |
|---|---|---|---|
| 3,497,655 | 2/1970 | Riff | 200—166 C |
| 3,029,559 | 4/1962 | Treptow | 65—43 X |
| 2,771,969 | 11/1956 | Brownlow | 65—43 X |
| 2,651,144 | 9/1953 | Foley et al. | 65—43 X |
| 2,480,453 | 8/1949 | Dorgelo et al. | 65—43 X |
| 2,450,130 | 9/1948 | Gordon et al. | 65—43 X |
| 3,495,061 | 2/1970 | Coffin et al. | 200—166 C |
| 3,251,121 | 5/1966 | Prival | 200—166 C X |
| 3,249,728 | 5/1966 | Sasamoto et al. | 200—166 C |
| 2,469,878 | 5/1949 | Hannon et al. | 200—166 C |

FOREIGN PATENTS

| | | | |
|---|---|---|---|
| 1,078,251 | 3/1960 | Germany | 335—154 |

OTHER REFERENCES

Isert, "Problems of Selecting and Optimally Treating Material for Producing Sealed Reed Contacts," Thesis, received in German Patent Office, Aug. 29, 1968, pp. 44–45.

ROBERT K. SCHAEFER, Primary Examiner

W. J. SMITH, Assistant Examiner